United States Patent
Fast

(10) Patent No.: US 6,202,736 B1
(45) Date of Patent: Mar. 20, 2001

(54) VEHICLE TRANSMISSION FLUID COOLER

(76) Inventor: Verlyn R. Fast, 4413 S. Holbrook Ave., Sioux Falls, SD (US) 57106

( * ) Notice: Subject to any disclaimer, the term of this patent is extended or adjusted under 35 U.S.C. 154(b) by 0 days.

(21) Appl. No.: 09/377,239

(22) Filed: Aug. 19, 1999

(51) Int. Cl.[7] .................................................. F01P 11/08
(52) U.S. Cl. ......................... 165/51; 165/185; 184/104.3
(58) Field of Search .................... 165/51, 185; 184/104.3

(56) References Cited

U.S. PATENT DOCUMENTS

| | | | | |
|---|---|---|---|---|
| 1,365,438 | * | 1/1921 | Adamson | 184/104.3 |
| 2,577,188 | * | 12/1951 | Hall | 184/106 |
| 3,817,354 | * | 6/1974 | Meiners | 184/104.3 |
| 4,022,272 | * | 5/1977 | Miller | 165/151 |
| 4,815,431 | * | 3/1989 | Yorita et al. | 123/196 AB |
| 4,898,261 | * | 2/1990 | Winberg et al. | 184/6.22 |

* cited by examiner

Primary Examiner—Allen Flanigan

(57) ABSTRACT

A vehicle transmission fluid cooler for enhancing the cooling of transmission fluid in a vehicle transmission. The vehicle transmission fluid cooler includes a perimeter mounting flange for mounting to the housing of the transmission. The perimeter mounting flange defines a hole for fluidly communicating with the access opening of the transmission when said perimeter mounting flange is mounted to the transmission housing. A body portion has a bottom wall and a peripheral wall. The peripheral wall extends upward from a periphery of the bottom wall such that an interior surface of the peripheral wall defines an interior of said body portion. The perimeter wall has a terminal end opposite the bottom wall. The terminal end of the peripheral wall is united to the perimeter mounting flange about the hole such that the interior of the peripheral wall is aligned with the hole for permitting transmission fluid of a transmission on which the perimeter mounting flange is mounted to flow through the access hole and the mounting flange into the interior of the body portion. A plurality of fins extend outwardly from an exterior surface of the peripheral wall of the body portion such that the fins are in thermal communication with the exterior and interior surfaces of the peripheral wall for transferring thermal energy from the transmission fluid to air surrounding said fins.

19 Claims, 3 Drawing Sheets

VEHICLE TRANSMISSION FLUID COOLER

BACKGROUND OF THE INVENTION

1. Field of the Invention

The present invention relates to vehicle transmission heat exchangers and more particularly pertains to a new vehicle transmission fluid cooler for enhancing the cooling of transmission fluid in a vehicle transmission, especially manual transmissions.

2. Description of the Prior Art

The use of vehicle transmission heat exchangers is known in the prior art. More specifically, vehicle transmission heat exchangers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,831,671; U.S. Pat. No. 3,996,999; U.S. Pat. No. 4,209,985; U.S. Pat. No. 4,217,926; U.S. Pat. No. 4,896,718; U.S. Pat. No. 4,903,760; U.S. Pat. No. 5,125,368; U.S. Pat. No. 5,244,036; U.S. Pat. No. 5,443,114; U.S. Pat. No. 5,456,129; and U.S. Pat. No. 5,749,439.

These devices require complex systems to circulate transmission fluid from a transmission to a heat exchanger of some sort and then back to the transmission. Most of these systems require a pump to move the fluid along the path. The pumps used have to be resistant to failure under high temperature conditions which causes such pumps to be expensive. The pathway between the transmission, pump and heat exchanger usually consists of costly high temperature hose that can resist high temperature as well as being highly durable due to the fact that the systems are mounted on the under side of the engines and thus are subject to impacts from debris from the road. The connections between components of such systems require a method of sealing that can withstand extreme temperature variations which can lead to leaks due to the inability of the seals to expand or contract as the need arises.

The vehicle transmission fluid cooler according to the present invention substantially departs from the conventional concepts and designs of the prior art, and in so doing provides an apparatus primarily developed for the purpose of enhancing the cooling of transmission fluid in a vehicle transmission.

SUMMARY OF THE INVENTION

In view of the foregoing disadvantages inherent in the known types of vehicle transmission heat exchangers now present in the prior art, the present invention provides a new vehicle transmission fluid cooler construction wherein the same can be utilized for cooling transmission fluid in a vehicle transmission.

The general purpose of the present invention, which will be described subsequently in greater detail, is to provide a new vehicle transmission fluid cooler apparatus and method which has many of the advantages of the transmission heat exchangers mentioned heretofore and many novel features that result in a new vehicle transmission fluid cooler which is not anticipated, rendered obvious, suggested, or even implied by any of the prior art transmission heat exchangers, either alone or in any combination thereof.

To attain this, the present invention generally comprises a perimeter mounting flange for mounting to the housing of the transmission. The perimeter mounting flange defines a hole for fluidly communicating with the access opening of the transmission when said perimeter mounting flange is mounted to the transmission housing. A body portion has a bottom wall and a peripheral wall. The peripheral wall extends upward from a periphery of the bottom wall such that an interior surface of the peripheral wall defines an interior of said body portion. The perimeter wall has a terminal end opposite the bottom wall. The terminal end of the peripheral wall is united to the perimeter mounting flange about the hole such that the interior of the peripheral wall is aligned with the hole for permitting transmission fluid of a transmission on which the perimeter mounting flange is mounted to flow through the access hole and the mounting flange into the interior of the body portion. A plurality of fins extend outwardly from an exterior surface of the peripheral wall of the body portion such that the fins are in thermal communication with the exterior and interior surfaces of the peripheral wall for transferring thermal energy from the transmission fluid to air surrounding said fins.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle transmission fluid cooler apparatus and method which has many of the advantages of the vehicle transmission heat exchangers mentioned heretofore and many novel features that result in a new vehicle transmission fluid cooler which is not anticipated, rendered obvious, suggested, or even implied by any of the prior art transmission heat exchangers, either alone or in any combination thereof.

It is another object of the present invention to provide a new vehicle transmission fluid cooler which may be easily and efficiently manufactured and marketed.

It is a further object of the present invention to provide a new vehicle transmission fluid cooler which is of a durable and reliable construction.

An even further object of the present invention is to provide a new vehicle transmission fluid cooler which is susceptible of a low cost of manufacture with regard to both materials and labor, and which accordingly is then susceptible of low prices of sale to the consuming public, thereby making such vehicle transmission fluid cooler economically available to the buying public.

Still yet another object of the present invention is to provide a new vehicle transmission fluid cooler which provides in the apparatuses and methods of the prior art some of the advantages thereof, while simultaneously overcoming some of the disadvantages normally associated therewith.

Still another object of the present invention is to provide a new vehicle transmission fluid cooler for enhancing the cooling of transmission fluid in a vehicle transmission.

Yet another object of the present invention is to provide a new vehicle transmission fluid cooler which includes a perimeter mounting flange for mounting to the housing of the transmission. The perimeter mounting flange defines a hole for fluidly communicating with the access opening of the transmission when said perimeter mounting flange is mounted to the transmission housing. A body portion has a bottom wall and a peripheral wall. The peripheral wall extends upward from a periphery of the bottom wall such that an interior surface of the peripheral wall defines an interior of said body portion. The perimeter wall has a terminal end opposite the bottom wall. The terminal end of the peripheral wall is united to the perimeter mounting flange about the hole such that the interior of the peripheral wall is aligned with the hole for permitting transmission fluid of a transmission on which the perimeter mounting flange is mounted to flow through the access hole and the mounting flange into the interior of the body portion. A plurality of fins extend outwardly from an exterior surface of the peripheral wall of the body portion such that the fins are in thermal communication with the exterior and interior surfaces of the peripheral wall for transferring thermal energy from the transmission fluid to air surrounding said fins.

Still yet another object of the present invention is to provide a new vehicle transmission fluid cooler that reduces the chance of viscosity breakdown of transmission fluid due to heat from increased loads on the transmission, and thereby increase the life and durability of heavy duty vehicle transmissions.

Even still another object of the present invention is to provide a new vehicle transmission fluid cooler that increases the exterior area of the housing containing the fluid, thus enhancing the transfer of heat from the fluid to the ambient air. Further, the fluid cooler takes advantage of the air flowing about the transmission on the underside of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
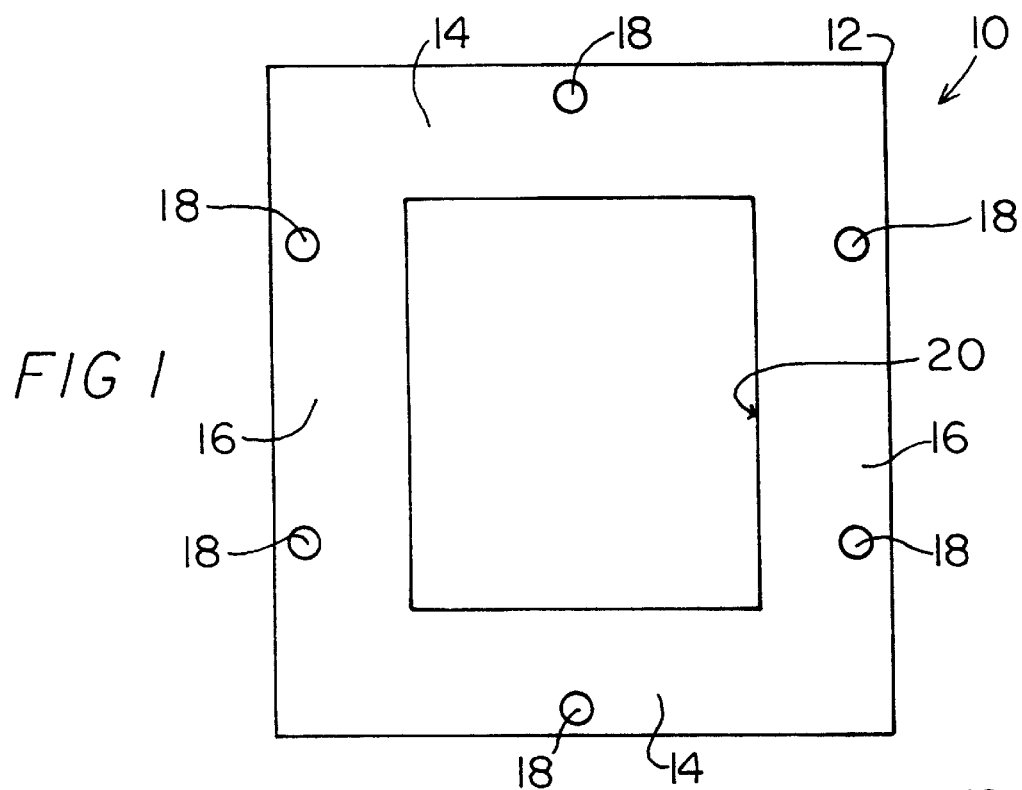
FIG. 1 is a schematic top plan view of a new vehicle transmission fluid cooler according to the present invention.
Figure 2:
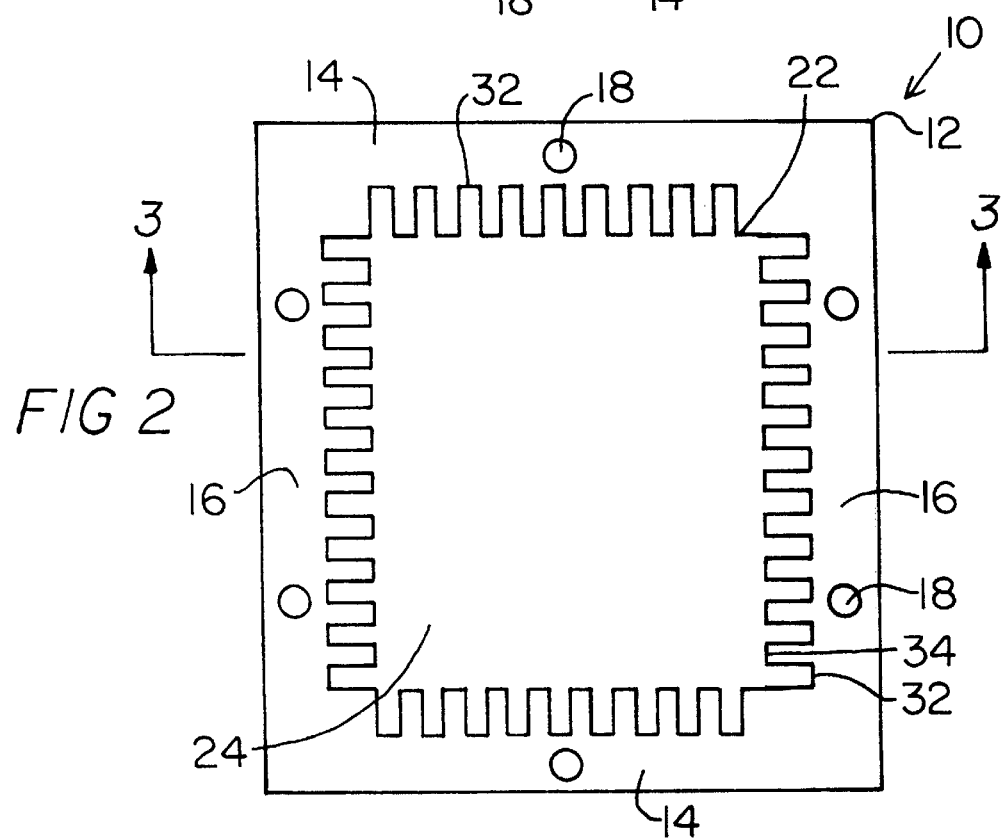
FIG. 2 is a schematic bottom plan view of the present invention particularly illustrating the interior of the cooler.

With reference now to the drawings, and in particular to FIGS. 1 through 6 thereof, a new vehicle transmission fluid cooler embodying the principles and concepts of the present invention and generally designated by the reference numeral 10 will be described.

The transmission fluid cooler of the invention is most suitably employed on the transmissions, especially manual transmissions 1 which have a "Power Take-Off" access opening intended for installation of a power take off (pto) apparatus. This access opening is normally covered (when no pto apparatus is installed) by a cover plate 2.

As best illustrated in FIGS. 1 through 6, the vehicle transmission fluid cooler 10 generally comprises a perimeter mounting flange 12 having a pair of end portions 14 and a pair of side portions 16. The perimeter mounting flange has a plurality of apertures therethrough. Each of the end portions has one of the apertures 18. Each of the side portions has at least one (preferably a pair) of the apertures. A rectangular hole 20 is centrally located through the perimeter mounting flange. The apertures of the perimeter mounting flange are alignable with the holes that normally secure the power take off plate to the transmission such that the perimeter mounting flange is for removably coupling to the transmission in place of the power take off cover plate. A seal of either a preformed rigid gasket or a putty gasket should be used between the transmission and the perimeter mounting flange to prevent leaks.

Figure 3:
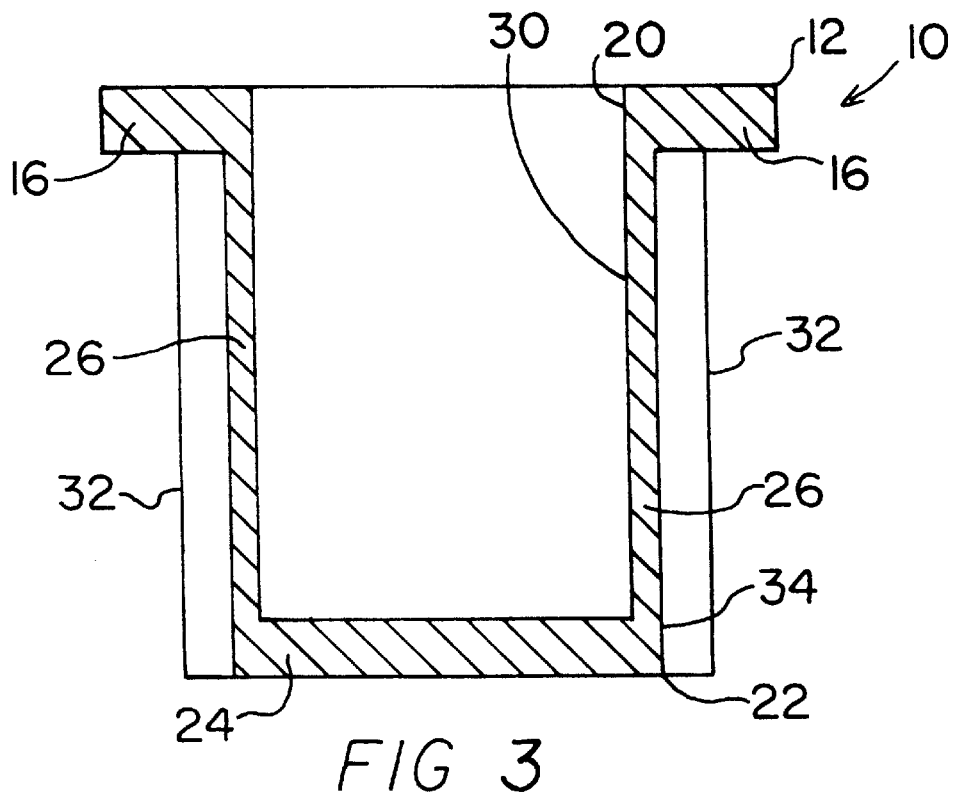
FIG. 3 is a schematic cross-sectional view of the present invention taken along line 3—3 of FIG. 2.
Figure 4:
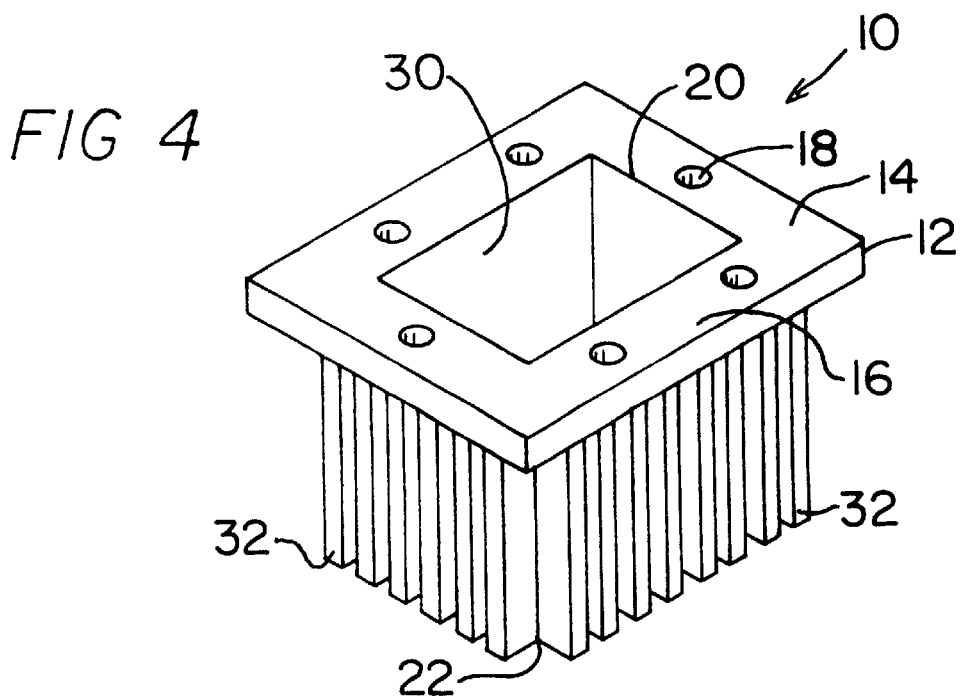
FIG. 4 is a schematic top perspective view of the present invention.
Figure 5:
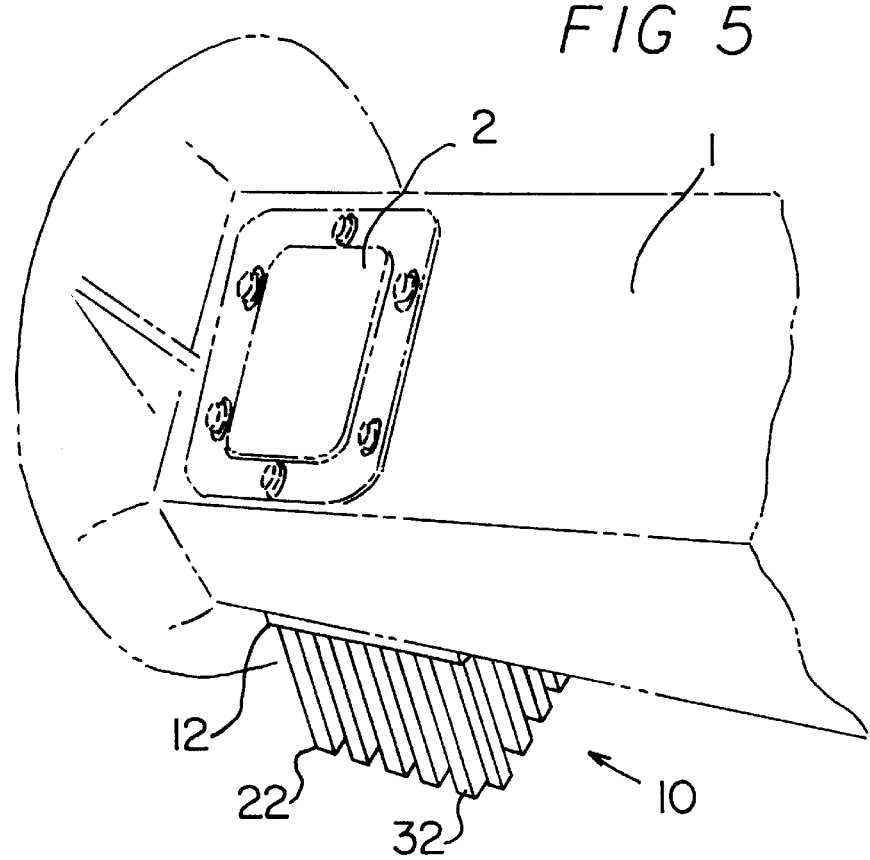
FIG. 5 is a schematic perspective view of the present invention in use on a transmission.
Figure 6:
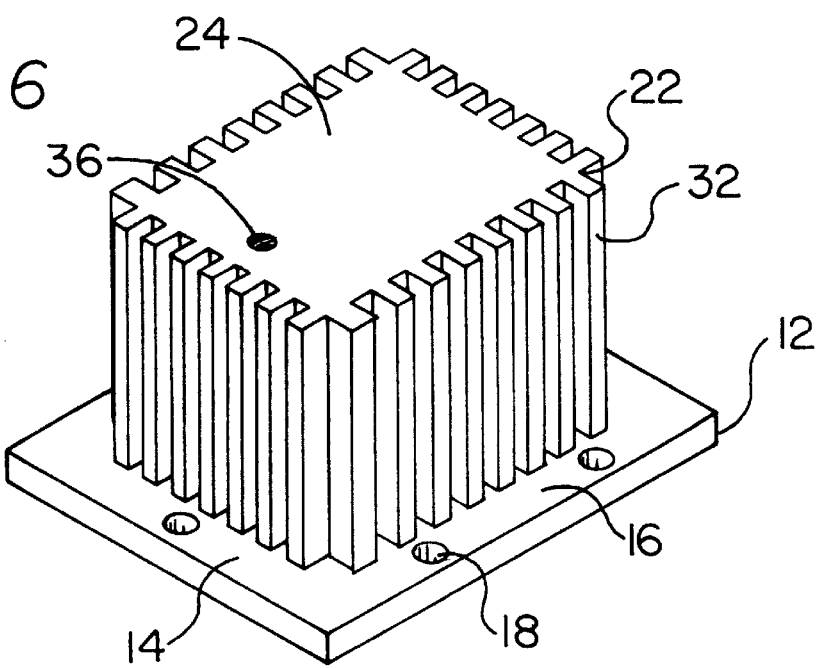
FIG. 6 is a schematic bottom perspective view of an embodiment of the present invention.

As shown in FIGS. 3 and 4, a body portion 22 has a substantially rectangular bottom wall 24 and a peripheral wall 26. The peripheral wall extends upward from a periphery of the bottom wall for defining a space therebetween. A terminal end 28 of the peripheral wall is coupled to the perimeter mounting flange such that an interior surface 30 of the peripheral wall is aligned with the hole of the perimeter mounting flange. The hole permits transmission fluid to move into the cooler for allowing thermal communication between the interior surface of the peripheral wall and the transmission fluid.

A plurality of substantially rectangular fins 32 are equidistantly spaced around an exterior surface 34 of the peripheral wall. The fins extend outward from the peripheral wall such that the fins orthogonally extend from the perimeter mounting flange to an outer surface of the bottom wall. The fins are in thermal communication with the peripheral wall such that thermal energy is transferred from the transmission fluid to the fins for external dissipation of the thermal energy.

In an embodiment, a thermal sensor may be secured to a sensor port 36 in the bottom wall of the body portion so that the temperature of the transmission fluid can be monitored.

In use, the power take off cover plate of a vehicle transmission is removed and the perimeter mounting flange is bolted in place of the cover plate such that the body portion extends away from the transmission. The transmission is then filled with transmission fluid to its proper fill point. The transmission when running circulates the transmission fluid throughout the inner cavity of the transmission and the space in the body portion of the fluid cooler. Heat from the transmission fluid is transferred to the interior surface of the peripheral wall and then outward to the fins. The air moving over the fins dissipates the heat into the atmosphere thus cooling the transmission fluid.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transmission fluid cooler for cooling transmission fluid of a transmission having a housing with an access opening, the transmission fluid cooler comprising:
    a perimeter mounting flange for mounting to the housing of the transmission, said perimeter mounting flange defining a hole for fluidly communicating with the access opening when said perimeter mounting flange is mounted to the transmission housing:
    a body portion having a bottom wall and a peripheral wall, said peripheral wall extending upward from a periphery of said bottom wall such that an interior surface of said peripheral wall defines an interior of said body portion, said perimeter wall having, a terminal end opposite said bottom wall, said terminal end of said peripheral wall being united to said perimeter mounting flange about said hole such that the interior of said peripheral wall is aligned with said hole for permitting transmission fluid of a transmission on which said perimeter mounting flange is mounted to flow through the access hole and said mounting flange into the interior of said body portion;
    a plurality of fins extending outwardly from an exterior surface of said peripheral wall of said body portion such that said fins are in thermal communication with said exterior and interior surfaces of said peripheral wall for transferring thermal energy from the transmission fluid to air surrounding said fins; and
    wherein said interior surface of said peripheral wall of said body portion and an interior Surface of said bottom wall of said body portion are each substantially flat for facilitating movement of the transmission fluid between the transmission and said body portion.

2. The transmission fluid cooler as set forth in claim 1 wherein said perimeter housing flange has a substantially rectangular configuration, said flange has a pair of end portions and a pair of side portions.

3. The transmission fluid cooler as set forth in claim 1 wherein said perimeter mounting flange has at least one aperture adapted for receiving fasteners adapted for securing a cover plate to the access opening of the transmission.

4. The transmission fluid cooler as set forth in claim 2 wherein each of said side portions has a plurality of apertures adapted for receiving fasteners adapted for securing a cover plate to the access opening of the transmission.

5. The transmission fluid cooler as set forth in claim 1 wherein said hole of said perimeter mounting flange has a rectangular configuration.

6. The transmission fluid cooler as set forth in claim 1 wherein each of said fins has a rectangular cross section.

7. The transmission fluid cooler as set forth in claim 1 wherein each of said fins orthogonally extend from the exterior surface of said perimeter wall and from said perimeter mounting flange to said bottom wall of said body portion.

8. The transmission fluid cooler as set forth in claim 1 further comprising a sensor port extending through said bottom wall of said body portion.

9. The transmission fluid cooler as set forth in claim 8 wherein said sensor port has internal threads for receiving a thermal sensor for sensing the temperature of the transmission fluid.

10. A transmission fluid cooler for cooling transmission fluid of a transmission having a housing with a power take off access opening and having a thermal sensor for sensing a temperature of the transmission fluid, the transmission fluid cooler comprising:
    a perimeter mounting flange for mounting to the housing of the transmission, said perimeter mounting flange defining a hole for fluidly communicating with the access opening when said perimeter mounting flange is mounted to the transmission housing, said hole of said perimeter mounting flange having a rectangular configuration;
    said perimeter housing flange having a substantially rectangular configuration, said flange having a pair of end portions and a pair of side portions, said perimeter housing flange having a plurality of apertures, each of said end portions having one of said apertures, each of said side portions having a pair of said apertures, said apertures of said flange adapted for receiving fasteners adapted for securing a power take off plate to the power take off access opening of the transmission;
    a body portion having a bottom wall and a peripheral wall, said peripheral wall extending upward from a periphery of said bottom wall such that an interior surface of said peripheral wall defines an interior of said body portion, said perimeter wall having a terminal end opposite said bottom wall, said terminal end of said peripheral wall being united to said perimeter mounting flange about said hole such that the interior of said peripheral wall is aligned with said hole for permitting transmission fluid of a transmission on which said perimeter mounting flange is mounted to flow through the access hole and said mounting flange into the interior of said body portion;
    a plurality of substantially rectangular fins being equidistantly spaced around an exterior surface of said peripheral wall of said body portion, said fins extending outwardly from said exterior surface of said peripheral wall such that said fins orthogonally extend from the exterior surface of said perimeter wall and from said perimeter mounting flange to an outer surface of said bottom wall, said fins being in thermal communication with said interior and exterior surfaces of said peripheral wall for transferring thermal energy from the transmission fluid to air surrounding said fins; and wherein said interior surface of said peripheral wall of said body portion and an interior surface of said bottom wall of said body portion are each substantially flat for facilitating movement of the transmission fluid between the transmission and said body portion.

11. A transmission fluid cooler system comprising, in combination:

a transmission having a housing with an access opening;

a perimeter mounting flange for mounting to said housing of said transmission, said perimeter mounting flange defining a hole for fluidly communicating with the access opening when said perimeter mounting flange is mounted to said housing of said transmission;

a body portion having a bottom wall and a peripheral wall, said peripheral wall extending upward from a periphery of said bottom wall such that an interior surface of said peripheral wall defines an interior of said body portion, said perimeter wall having a terminal end opposite said bottom wall, said terminal end of said peripheral wall being united to said perimeter mounting flange about said hole such that the interior of said peripheral wall is aligned with said hole for permitting transmission fluid of said transmission on which said perimeter mounting flange is mounted to flow through said access hole and said mounting flange into the interior of said body portion;

a plurality of fins extending outwardly from an exterior surface of said peripheral wall of said body portion such that said fins are in thermal communication with said exterior and interior surfaces of said peripheral wall for transferring thermal energy from the transmission fluid to air surrounding said fins; and wherein said interior surface of said peripheral wall of said body portion and an interior surface of said bottom wall of said body portion are each substantially flat for facilitating movement of the transmission fluid between said transmission and said body portion.

12. The transmission fluid cooler system as set forth in claim 11 wherein said perimeter housing flange has a substantially rectangular configuration, said flange has a pair of end portions and a pair of side portions.

13. The transmission fluid cooler system as set forth in claim 11 wherein said perimeter mounting flange has at least one aperture being for receiving fasteners for securing a cover plate to said access opening of said transmission.

14. The transmission fluid cooler system as set forth in claim 12 wherein each of said side portions has a plurality of apertures being for receiving fasteners for securing a cover plate to said access opening of said transmission.

15. The transmission fluid cooler system as set forth in claim 11 wherein said hole of said perimeter mounting flange has a rectangular configuration.

16. The transmission fluid cooler system as set forth in claim 11 wherein each of said fins has a rectangular cross section.

17. The transmission fluid cooler system as set forth in claim 11 wherein each of said fins orthogonally extend from said exterior surface of said perimeter wall and from said perimeter mounting flange to said bottom wall of said body portion.

18. The transmission fluid cooler system as set forth in claim 11 further comprising a sensor port extending through said bottom wall of said body portion.

19. The transmission fluid cooler as set forth in claim 18 wherein said sensor port has internal threads for receiving a thermal sensor adapted for sensing the temperature of the transmission fluid.

* * * * *